United States Patent
Heckner et al.

(10) Patent No.: US 10,705,034 B2
(45) Date of Patent: Jul. 7, 2020

(54) METHOD FOR DETECTING SURFACE IMPURITIES BY X-RAY FLUORESCENCE ANALYSIS

(71) Applicant: AIRBUS DEFENCE AND SPACE GMBH, Taufkirchen (DE)

(72) Inventors: Sebastian Heckner, Munich (DE); Georg Wachinger, Rosenheim (DE); Thomas Meer, Egmating (DE); Matthias Geistbeck, Mindelheim (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 596 days.

(21) Appl. No.: 15/337,153

(22) Filed: Oct. 28, 2016

(65) Prior Publication Data
US 2017/0122888 A1    May 4, 2017

(30) Foreign Application Priority Data
Oct. 30, 2015   (DE) .................. 10 2015 221 323

(51) Int. Cl.
*G01N 23/223*    (2006.01)
(52) U.S. Cl.
CPC ..... *G01N 23/223* (2013.01); *G01N 2223/076* (2013.01); *G01N 2223/1016* (2013.01);
(Continued)
(58) Field of Classification Search
None
See application file for complete search history.

(56) References Cited

U.S. PATENT DOCUMENTS 6,233,307 B1    5/2001    Golenhofen
6,314,158 B1    11/2001   Shiota et al.
(Continued)

FOREIGN PATENT DOCUMENTS

DE    102004019030 A1   11/2005
DE    102011102055 B4   11/2012
(Continued)

OTHER PUBLICATIONS

German Search Report for Application No. 10 2015 221 323 dated Nov. 13, 2015.
(Continued)

*Primary Examiner* — Hoon K Song
(74) *Attorney, Agent, or Firm* — Jenkins, Wilson, Taylor & Hunt, P.A.

(57) ABSTRACT

A method for detecting surface impurities on a surface of a component by X-ray fluorescence analysis uses a hand spectroscope for application to the surface of a component. The hand spectroscope comprises an X-ray source, a fluorescent radiation detector, an analyzer and a display. The method comprises irradiating the surface of the component with X-rays using the X-ray source; detecting fluorescent radiation, which is emitted by the surface of the component as a result of the irradiation with the X-rays, using the fluorescent radiation detector; measuring a radiation spectrum of the detected fluorescent radiation; generating an evaluation result by analyzing the measured radiation spectrum using the analyzer, the evaluation result comprising a quantitative measure of the surface impurity of the surface due to predetermined characteristic substances; and outputting the generated evaluation result on the display.

13 Claims, 1 Drawing Sheet

(52) U.S. Cl.
CPC . *G01N 2223/301* (2013.01); *G01N 2223/408* (2013.01); *G01N 2223/615* (2013.01); *G01N 2223/652* (2013.01)

(56) References Cited

U.S. PATENT DOCUMENTS

| | | | |
|---|---|---|---|
| 6,459,767 B1 | 10/2002 | Boyer | |
| 6,829,327 B1 | 12/2004 | Chen | |
| 7,065,174 B2 | 6/2006 | Sipila et al. | |
| 7,508,500 B2* | 3/2009 | Rajeswaran | G01N 21/65 250/341.1 |
| 8,064,570 B2 | 11/2011 | Tannian et al. | |
| 8,330,109 B2 | 12/2012 | Werner et al. | |
| 8,433,034 B2 | 4/2013 | Grodzins | |
| 9,719,898 B2* | 8/2017 | Beer | G01N 1/2214 |
| 2005/0157843 A1 | 7/2005 | Chen et al. | |
| 2006/0029182 A1 | 2/2006 | Tani et al. | |
| 2007/0269003 A1* | 11/2007 | Puusaari | G01N 23/223 378/44 |
| 2008/0205593 A1 | 8/2008 | Yellepeddi | |
| 2009/0129541 A1 | 5/2009 | Ong et al. | |
| 2009/0262889 A1 | 10/2009 | Dugas et al. | |
| 2010/0080351 A1 | 4/2010 | Hession-Kunz et al. | |
| 2012/0257716 A1* | 10/2012 | Grodzins | G01N 23/223 378/45 |
| 2014/0190247 A1 | 7/2014 | Beer et al. | |
| 2017/0038319 A1* | 2/2017 | Kumar | G01N 23/223 |

FOREIGN PATENT DOCUMENTS

| | | |
|---|---|---|
| EP | 0781992 A1 | 7/1997 |
| EP | 2851678 A1 | 3/2015 |
| WO | WO 91/16621 A1 | 10/1991 |
| WO | WO 2008/100914 A2 | 8/2008 |
| WO | WO 2014/186292 A1 | 11/2014 |

OTHER PUBLICATIONS

Albinsky et al., "Advances in Bonded Repair of CFRP Aircraft Structures by Surface Inspection," 2nd International Conference on Advanced Composite Materials and Technologies for Aerospace Applications, pp. 38-42, Jun. 13, 2012.

Extended European Search Report for Application No. 16195480.5 dated Feb. 21, 2017.

* cited by examiner

METHOD FOR DETECTING SURFACE IMPURITIES BY X-RAY FLUORESCENCE ANALYSIS

CROSS-REFERENCE TO RELATED APPLICATION

This application claims priority to German patent application DE 10 2015 221 323.4 filed Oct. 30, 2015, the entire disclosure of which is incorporated by reference herein.

TECHNICAL FIELD

The present disclosure relates to a method for detecting surface impurities by X-ray fluorescence analysis. In particular, the present disclosure deals with detecting surface impurities on fiber composite plastics material components for use in aircraft or spacecraft.

BACKGROUND

Although applicable in numerous applications for analyzing surfaces of a wide range of structures and various materials, the present disclosure and the problems on which it is based are described in greater detail in relation to surface analysis of fiber composite plastics material aircraft structures.

For the industrial manufacture of molded components from fiber-reinforced plastics material (FRP), in particular carbon-fiber-reinforced plastics material (CFRP), molding tools are often used, in which the components are shaped. For this purpose, for example, a fiber material semi-finished product, for example mats made of unidirectional carbon fiber layers, can be impregnated with a matrix material, for example epoxy resin, and cured in the molding tool by applying pressure and temperature. The mold surface of the molding tool determines the surface contour of the finished component which is left behind after curing. Molding tools of this type are often coated with a release agent before use (for example by applying a liquid chemical release agent) so as to be able to release the finished components from the molding tool as easily as possible. After the component is demolded, depending on the method of manufacture, undesired release agent residues may be left behind both on the mold surface and on the component.

Generally, it is desirable to form and obtain FRP components having as precisely defined and clean a surface as possible, so as to provide for further use or machining. Thus, for example, the adhesive properties of a component can be influenced if the surface thereof is soiled or contaminated with undesired substances. Furthermore, good adhesion properties are advantageous for painting or coating a component. Accordingly, there is a need for methods which qualitatively and quantitatively detect impurities on surfaces of FRP components.

For example, laser-induced plasma spectroscopy makes it possible to detect the chemical element silicon in surface contaminations consisting of siloxanes. As a further example, U.S. Pat. No. 8,330,109 B2 teaches that FTIR spectroscopy ("Fourier transform infrared spectrometer") can be used for detecting surface impurities on non-metal materials. DE 10 2011 102 055 B4 further discloses a method in which a fiber composite component is heated regionally to desorb contaminant substances which are thereupon detected as gas by a plurality of sensors. Generally, in similar methods, sample surfaces can be heated using various forms of radiation so as to convert non-volatile substances into gas at least in part and subsequently to detect them using a detector. Furthermore, for example, U.S. Pat. No. 8,064,570 B2 discloses handheld analysis instruments for X-ray fluorescence analysis (XRFA), by which elements in substance samples can be detected.

SUMMARY

One of the ideas of the present disclosure is to find solutions for detecting methods which make it possible to measure even slight surface impurities in a simple, rapid, non-destructive manner.

Accordingly, a method is provided for detecting surface impurities on a surface of a component by X-ray fluorescence analysis using a hand spectroscope for application to the surface of the component. The hand spectroscope comprises an X-ray source, a fluorescent radiation detector, an analyzer and a display. The method comprises irradiating the surface of the component with X-rays using the X-ray source. The method further comprises detecting fluorescent radiation, which is emitted from the surface of the component as a result of the irradiation with the X-rays, using the fluorescent radiation detector. The method further comprises measuring a radiation spectrum of the detected fluorescent radiation. The method further comprises generating an evaluation result by analyzing the measured radiation spectrum using the analyzer, the analysis result comprising a quantitative measure of the surface impurity in the surface due to predetermined characteristic substances. The method further comprises outputting the generated evaluation result on the display.

The finding behind the present disclosure is to use X-ray fluorescence analysis (XRFA) or X-ray fluorescence spectroscopy (XRFS) for non-destructive analysis of contaminated or soiled surfaces. The material of the surface in question is excited using X-rays, as a result of which electrons are ejected from the inner shells of the surface atoms. The vacancies are re-occupied by electrons from higher energy levels, energy being emitted in the form of fluorescent radiation, the spectrum of which is in turn specific to the elemental composition of the surface. Thus, particular elements may be observable for example as peaks in the radiation intensity, the height, width and/or area of which may be characteristic of the contained substance amount of the element in question. Release agents to be detected typically contain particular characteristic elements or characteristic substances which are detectable by the method according to the disclosure herein. For example, the release agents used in the production of CFRP components are often based on the release action of silicon, hydrofluorocarbons, in particular including perfluorinated hydrofluorocarbons, and/or hydrocarbons. For example, in particular applications, there may be a need to detect polytetrafluoroethylene (PTFE, for example Teflon®) or wax oils.

A particular advantage of the solution according to the disclosure herein is that a handheld or portable X-ray fluorescence spectroscope is used so as to analyze the elemental composition of surfaces non-destructively. A hand spectroscope of this type is particularly practical and simple to handle. To analyze a surface, it merely needs to be applied to the surface for a time. Moreover, the method according to the disclosure herein is particularly sensitive, and can even be applied to very low layer thicknesses down to monolayers, so as to detect even slight contaminations. The captured data are analyzed automatically in situ using the analyzer and made directly accessible to the user using the display. The disclosure herein makes it possible in particular to detect release agent residues on surfaces using a portable instrument within extremely short measuring times of below one minute, in other words in the order of magnitude of seconds. The solution according to the disclosure herein is especially advantageous for analyzing FRP or CFRP surfaces such as are commonly found in aircraft or spacecraft, since the release agents to be detected in these cases occur exclusively in the region of the surface. Particular components characteristic of the release agent may thus be found exclusively or predominantly in the region of a soiled surface, meaning that they characterize the emitted fluorescence spectrum of a component in a detectable manner even at low substance amounts. The present disclosure can be used for example for surface contamination detecting during gluing and/or repair processes and/or painting operations. Analyzable surfaces include both organic and inorganic compositions. In particular, the composition and the amount of release agent residues, for example liquid release agents, on FRP materials can be detected in a rapid and simple manner, in such a way that they can subsequently be removed and the removal thereof can be checked.

In known methods, it is extremely difficult to measure surface impurities in liquid or solid form, since in typical applications the contaminations occur in very thin layer thicknesses, and the elements to be detected are thus only present in very small substance amounts. For this purpose, surface-sensitive methods such as those of the present disclosure are advantageous. In typical known methods, the lower bounds on the sensitivity are often insufficient to detect such small substance amounts quantitatively and in a short time. Additionally, the known methods often have a complex, cumbersome/permanently installed construction (radiation sources, detector unit, analysis unit etc.). For example, methods based on releasing the contaminant substances in a gaseous phase cannot be used to detect non-volatile release agent residues, since these are not necessarily able to be brought into a gaseous phase without considerable effort and without damaging the substrate material. By contrast, the method according to the present disclosure makes possible simple, rapid, non-destructive analysis of even slight surface impurities.

In some embodiments, generating the evaluation result may comprise comparing the measured radiation spectrum with one or more reference spectra of purified surfaces and/or of surfaces soiled in a defined manner. Using the reference spectra, the hand spectroscope is calibrated to some extent, so as to be able to provide quantitative measurement results fully automatically and rapidly by comparison with the reference spectra. For example, it may be provided that particular reference spectra are stored in a storage device (for example a memory card) in the hand spectroscope, in such a way that they can be retrieved (automatically) at any time. For example, reference spectra may already be installed on the hand spectroscope by the manufacturer. Moreover, however, it may be provided that users can also add new reference spectra themselves. For example, a component comprising a surface for analysis may be present in various forms. One form of the component may for example be a surface substantially cleaned of release agents and/or other impurities. By contrast, a further form of the component may comprise a soiled surface, but the specific impurity may be known; for example, these impurities may have been determined by other methods and/or may have been applied in a defined, controlled manner. In a first step, a user can now apply the method according to the disclosure herein to the cleaned component and measure a radiation spectrum using the hand spectroscope. The obtained radiation spectrum can in turn be stored in the storage device of the hand spectroscope as a reference spectrum. In a second step, the user can apply the method according to the disclosure herein accordingly to the component soiled in a defined manner, so as also to store the radiation spectrum obtained therefrom as a further reference spectrum. In a third step, the user can now analyze the surface of a third component having unknown surface impurity, it being possible to compare the radiation spectrum obtained from the third component with one or more of the previously obtained reference spectra so as to obtain an objective quantitative measure of the impurity in the surface of the third component. In principle, the user can capture substantially any desired number of reference spectra and store them for subsequent use.

In some embodiments, generating the evaluation result may comprise comparing the measured radiation spectrum with calibration curves obtained from X-ray fluorescence analysis. These calibration curves may for example be derived from particular defined substance samples (unlike radiation spectra, which have been obtained from surface analysis of specific components). An analysis of a surface impurity in a particular component can be supplemented by the use of calibration curves or the precision of the analysis can be improved by the use of the curves. The properties of particular substances can thus be taken into account in fixedly predetermined conditions.

In some embodiments, generating the evaluation result may comprise univariate, in other words one-dimensional, analysis of peak heights, peak widths and/or peak areas of radiation intensities of the measured radiation spectrum which is associated with the characteristic substances. In this development, the method can be made particularly simple, rapid and at the same time robust, in such a way that measurement results can be available in an extremely short time.

In some embodiments, generating the evaluation result may comprise multivariate, in other words multi-dimensional, analysis of the measured radiation spectrum on the basis of a chemometric method. Thus, in the method according to this development, known mathematical and statistical tools from the field of multivariate data analysis may be used. These developments of the method may be used in particular for detecting very slight impurities, for which simpler analysis methods may not be sufficiently sensitive. A person skilled in the art will be able to select appropriately between different analysis methods so as to find a compromise suitable for the application in question between the precision and the complexity, in other words ultimately the duration, of the analysis. In developments of the hand spectroscope, different analysis methods may be implemented; for example, they may be stored in the storage device, the user being able to select from various options.

In some embodiments, the chemometric method may comprise a principal component analysis and/or a partial least squares analysis or similar multivariate analysis methods. A principal component analysis (PCA) is one of many advantageous methods of multivariate data analysis. A plurality of statistical (correlated) variables are approximated by a low number of maximally predictive (uncorrelated) principal components, in other words advantageous linear combinations of the variables (known as latent variables). Partial least squares analysis (PLS) is a further method of multivariate data analysis which can improve or replace a simple multiple linear regression in cases where there is a very large number of variables or the variables are strongly correlated. Similarly to in principal component analysis, it is assumed that the data can be approximated using a relatively small number of latent variables.

In some embodiments, the method for detecting surface impurities may be carried out on a surface of a fiber-reinforced plastics material (FRP) component.

In some embodiments, the FRP may be a carbon-fiber-reinforced plastics material (CFRP).

In some embodiments, the characteristic substances may comprise components of release agents for producing FRP components. For example, this may be a liquid release agent.

In some embodiments, the characteristic substances may comprise silicon, hydrofluorocarbons and/or hydrocarbons.

In some embodiments, the hand spectroscope may further comprise a radiation-permeable radiation window, a measurement chamber adjacent to the radiation window and defining a controlled volume, and a gas flush coupled to the measurement chamber. The method may further comprise flushing the measurement chamber with an operating gas using the gas flush. The operating gas, for example helium, may be supplied to the hand spectroscope for example via a gas feed. The helium displaces the air between the radiation window and the fluorescent radiation detector of the hand spectroscope, preventing the X-rays from being absorbed by the environment before striking the detector. As a result, the sensitivity of the hand spectroscope can be significantly improved.

In some embodiments, the hand spectroscope may further comprise a data interface. The method may further comprise the method step of passing the measured radiation spectrum and/or the evaluation result to external data processing devices via the data interface. For example, the analyzer of the hand spectroscope may comprise a microprocessor or the like. The data interface may for example be a USB connection, a Bluetooth® or WLAN unit or the like. As a result, the data captured by the hand spectroscope can be passed for example to an external computer where they are to be processed further.

The above embodiments can be combined in any desired manner, within reason. Further possible embodiments, developments and implementations of the disclosure herein also include combinations not explicitly mentioned of features of the disclosure herein which are disclosed above or in the following in relation to the embodiments. In particular, a person skilled in the art will also add individual aspects to the relevant basic form of the present disclosure as improvements or additions.

BRIEF DESCRIPTION OF THE DRAWINGS

In the following, the present disclosure is described in greater detail by way of the embodiments set out in the schematic drawings, in which.

DETAILED DESCRIPTION

Figure 1:
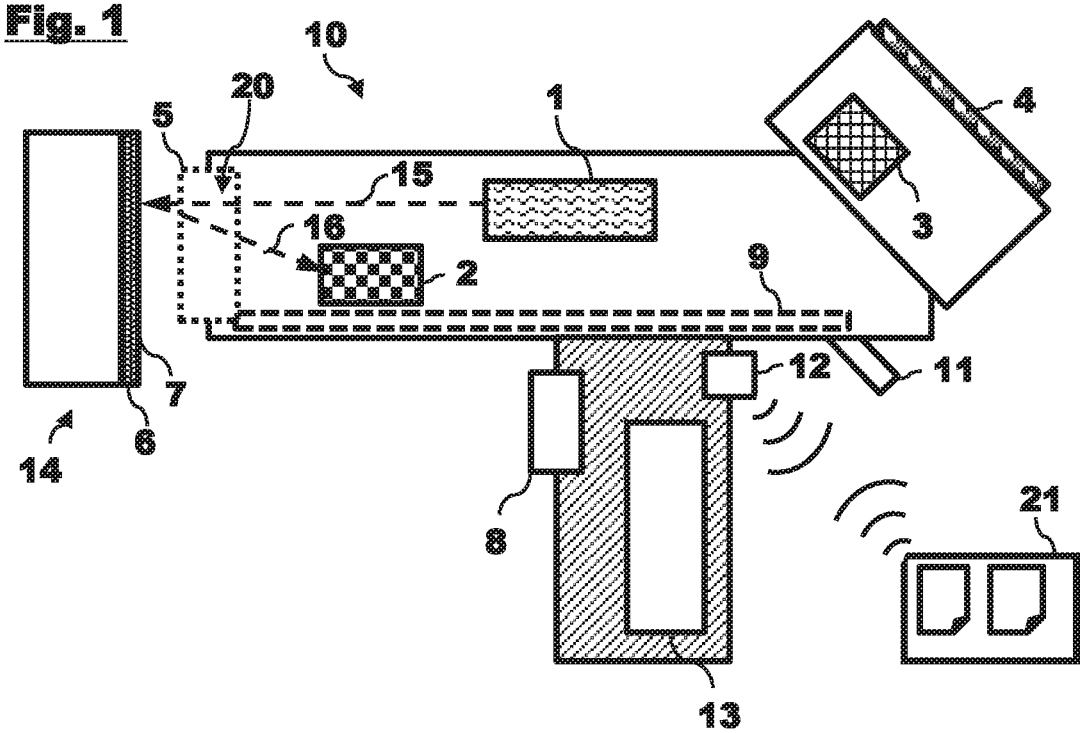
FIG. 1 is a schematic cross section of a surface of a component having an applied hand spectroscope for detecting surface impurities on the surface by X-ray fluorescence analysis in accordance with an embodiment of the disclosure herein.

The accompanying drawings are intended to provide further understanding of the embodiments of the disclosure herein. They illustrate embodiments and are intended to explain principles and concepts of the disclosure herein in conjunction with the description. Other embodiments and many of the aforementioned advantages may be seen from the drawings. The elements of the drawings are not necessarily to scale.

In the drawings, unless otherwise specified, like, functionally equivalent and equivalently acting elements, features and components are provided with like reference numerals in each case.

FIG. 1 is a schematic cross-sectional view of a surface of a component having an applied hand spectroscope for detecting surface impurities on the surface by X-ray fluorescence analyses in accordance with an embodiment of the disclosure herein.

In FIG. 1a, reference numeral 10 denotes the hand spectroscope 1. The hand spectroscope 10 is designed to be carried by a user by hand so as to carry out X-ray fluorescence analysis on a component 14 in situ. The hand spectroscope 10 basically comprises an X-ray source 1, a fluorescent radiation detector 2, an analyzer 3 and a display 4. The hand spectroscope 10 may further comprise an energy store 13, for example a battery or the like, or alternatively or in addition be designed for connection to an external power source.

To carry out the X-ray fluorescence analysis, the hand spectroscope 10 may be held against the surface 6 of a component 14. For example, this may be a carbon-fiber-reinforced plastics material (CFRP) component 14, the surface 6 of which is soiled or contaminated with residues of release agents (surface impurity 7) as a result of production. In particular, this may be a component 14 for use in aircraft or spacecraft, such as a structural component (stringer, former, skin field portion or the like) or a cabin equipment element etc.

The X-ray source 1 is for emitting X-rays 15, which strike the surface 6 through a radiation-permeable radiation window 5 of the hand spectroscope 10 and excite the surface to emit fluorescent radiation 16. For example, an actuation element 8, by which the emission of the X-rays 15 can be triggered or interrupted, may be provided on a handle or the like in the hand spectroscope 10. In addition, by virtue of the geometric position thereof, the radiation window 5 may additionally provide a focussing distance between the X-ray source 1 and the surface 6. The fluorescence radiation 16 emitted by the surface 6 passes back through the radiation window 5 into the hand spectroscope 10 again, where it is detected by the fluorescent radiation detector 2. In particular, the fluorescent radiation detector measures a radiation spectrum 17 of the detected fluorescence radiation 16. Furthermore, a measurement chamber 20, which defines a controlled volume and is coupled to a gas flush 9, is provided adjacent to the radiation window 5 in the hand spectroscope 10. Before the surface 6 o the component 14 is irradiated with X-rays 15, the measurement chamber 20 can be flushed with an operating gas (for example helium) using the gas flush 9, so as to displace the air between the radiation window 5 and the fluorescent radiation detector 2 of the hand spectroscope 10. As a result, the sensitivity of the hand spectroscope 10 can be significantly improved. The gas flush 9 may, for example, be supplied via a gas feed 11 which is admitted into the hand spectroscope 10.

The analyzer 3 may for example contain a microprocessor or the like, by which the radiation spectrum 17 measured by the fluorescent radiation detector 2 can be evaluated, as is described in greater detail below with reference to FIGS. 2 and 3. The analyzer 3 is designed to extract from the measured radiation spectrum 17 an evaluation result 19, which among other things comprises a quantitative measure of the surface impurity 7 of the surface 6 due to predetermined characteristic substances. Characteristic substances within the meaning of the disclosure herein comprise, among other things, elemental components of the release agents which are typically used in CFRP production. In particular, the characteristic substances comprise elemental silicon, hydrofluorocarbons and/or hydrocarbons. For this purpose, the analyzer 3 may in particular comprise an analysis software, which may comprise both univariate and complex multivariate analysis tools for statistical data analysis.

The display 4 may for example be formed as a display, monitor or the like so as to output the evaluation result 19 generated by the analyzer 3 to the user, for example in a graphical processing similar to a computer monitor. Moreover, the display 4 may output further relevant information, such as measured or stored radiation spectra 17, calibration and/or focussing data etc.

The hand spectroscope 10 further comprises a data interface 12, via which the captured data, for example the measured radiation spectra 17, and the analysis results, for example the evaluation result 19, can be passed to an external data processing device 21, for example a computer network, a computer or the like. The data interface may for example be a USB connection, a Bluetooth® or WLAN unit or the like via which the captured data can be passed for example to an external computer.

Figure 2:
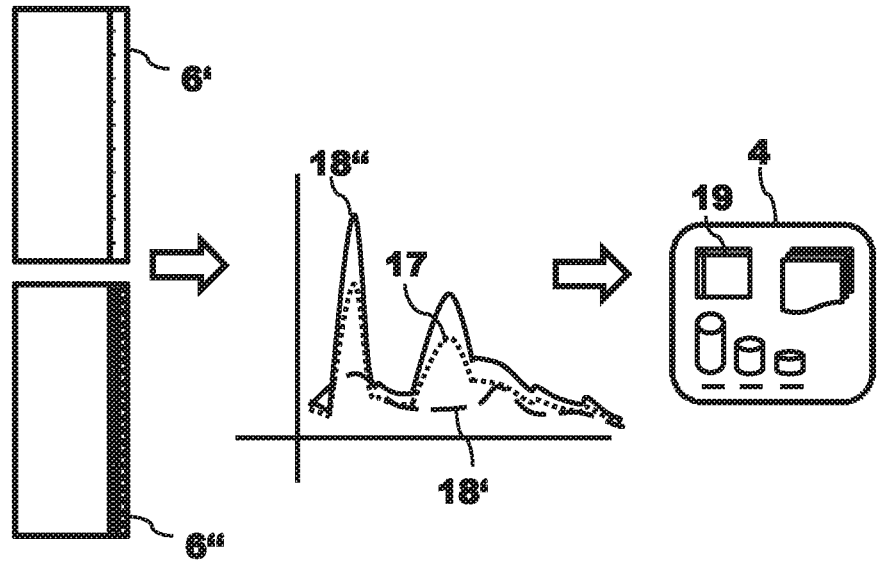
FIG. 2 is a schematic flow chart of the evaluation of radiation spectra which have been measured by the hand spectroscope in FIG. 1.
Figure 3:
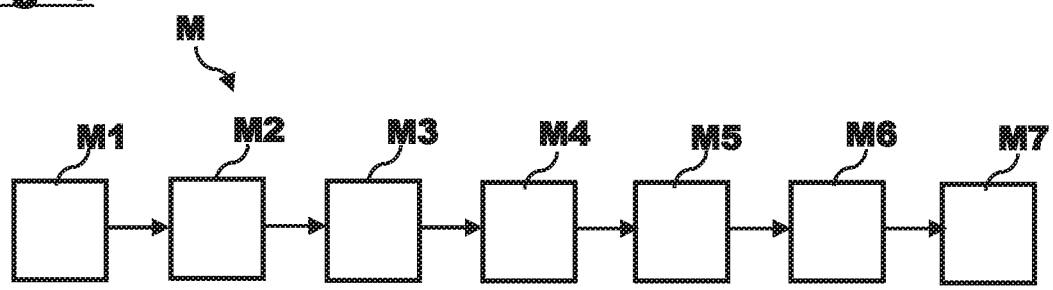
FIG. 3 is a schematic flow chart of a method for detecting surface impurities on a surface of a component by X-ray fluorescence analysis in accordance with a further embodiment of the disclosure herein.

FIG. 2 is a schematic flow chart of the evaluation of radiation spectra 17 which have been measured using the hand spectroscope 10 in FIG. 1. For this purpose, FIG. 3 shows a schematic flow chart of the basic method M for detecting the surface impurities 7 on the surface 6 of the component 14 by X-ray fluorescence analysis.

At M1, the method comprises optionally flushing the measurement chamber 20 with an operating gas using the gas flush 9. Furthermore, at M2, the method M comprises irradiating the surface 6 of the component 14 with X-rays 15 using the X-ray source 1. Next, at M3, the method comprises detecting fluorescent radiation 16 using the fluorescent radiation detector 2. The fluorescent radiation 16 is emitted by the surface 6 of the component 14 as a result of the irradiation with the X-rays 15. In the following step, at M4, the method comprises measuring a radiation spectrum 17 of the detected fluorescent radiation 16.

Furthermore, at M5, the method comprises generating an evaluation result 19 by analyzing the measured radiation spectrum 17 using the analyzer 3. The evaluation result 19 comprises a quantitative measure of the surface impurity 7 in the surface 6 due to predetermined characteristic substances. The measured radiation spectrum 17 may be compared with one or more reference spectra 18', 18" of cleaned surfaces 6' and/or of defined soiled surface 6".

Alternatively or in addition, generating the evaluation result 19 may comprise comparing the measured radiation spectrum 17 with calibration curves which are obtained from X-ray fluorescence analysis of substance samples. The analyzer 3 may be designed to use univariate and/or multivariate analysis methods to generate the evaluation result 19. For example, the method M may comprise analyzing peak heights, peak widths and/or peak areas of radiation intensities of the measured radiation spectrum 17. Furthermore, the method M may comprise multivariate analysis of the measured radiation spectrum 17 on the basis of a chemometric method, which may for example include principal component analysis and/or partial least squares analysis.

Next, at M6 the method comprises outputting the generated evaluation result 19 on the display 4. Finally, at M7, the method comprises the optional step of passing the measured radiation spectrum 17 and/or the evaluation result 19 to an external data processing device 21.

FIG. 2 shows schematically the basic sequence of the analysis of the measured radiation spectrum 17 to generate an evaluation result 19. the method M provides comparing the measured radiation spectrum 17 (center of FIG. 2) with reference spectra 18', 18" and analyzing, by building thereon, whether or not characteristic substances are contained in the surface 6 associated with the radiation spectrum 17 (see FIG. 1) in detectable substance amounts, in other words whether the surface 6 is contaminated or soiled with these substances. Using the reference spectra 18', 18", the hand spectroscope 10 is calibrated to some extent. It may be provided that this comparison with the reference spectra 18', 18" and the entire analysis of the measured radiation spectra 17 is carried out fully automatically by the analyzer 3. Alternatively, however, it may equally be provided that individual steps or aspects of the analysis or of the method (M) can be set or selected manually by input or configuration by a user. Fully automatic analysis has the advantage that quantitative measurement results can be outputted very rapidly and conveniently. For example, it may be provided that particular reference spectra 18', 18" are already stored on a storage card (not shown) of the hand spectroscope 10, in such a way that they can be retrieved automatically at any time.

Moreover, however, it may be provided that a user can add new reference spectra 18', 18" himself. As an example, FIG. 2 shows two surfaces 6', 6". For example, a first of the two surfaces 6' may be cleaned whilst a second of the two surfaces 6" is soiled in a defined and controlled manner with known characteristic substances. In one step, a user may now apply the method M to the cleaned surface 6' and measure and store a first reference spectrum 18' using the hand spectroscope 10. In another step, the user can apply the method M accordingly to the surface 6" soiled in a defined manner, so as also to store the further reference spectrum 18" obtained therefrom. Once the radiation spectrum 17 of the surface 6 for analysis is measured, it can now be compared with the previously obtained reference spectra 18', 18", and from this an objective quantitative measure of the impurity of the surface 6 of the component 14 can be obtained.

The method M makes possible simple, rapid, automatic, non-destructive analysis of even slight surface impurities 7, and is therefore particularly practicable. The method M can be used in numerous applications, which include in particular the production and use of fiber-reinforced plastics material components. Thus, the present disclosure can be used in particular in transportation, for example in aircraft and spacecraft construction or the like.

In the above detailed description, various features have been combined in one or more examples to improve the cogency of what is described. However, it should be clear that the above description is merely illustrative and in no way limiting in nature. It is intended to cover all alternatives, modifications and equivalents of the various features and embodiments. Many other examples will be immediately and directly apparent to a person skilled in the art in view of the above description as a result of his expert knowledge.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for detecting surface impurities on a surface of a component by X-ray fluorescence analysis using a hand spectroscope for application to the surface of the component, wherein the hand spectroscope comprises an X-ray source, a fluorescent radiation detector, an analyzer and a display, the method comprising:
   irradiating the surface of the component with X-rays using the X-ray source;
   detecting fluorescent radiation, which is emitted by the surface of the component as a result of irradiating with the X-rays, using the fluorescent radiation detector;
   measuring a radiation spectrum of the detected fluorescent radiation;
   generating an evaluation result by analyzing the measured radiation spectrum using the analyzer, the evaluation result comprising a quantitative measure of a surface impurity of the surface due to predetermined characteristic substances; and
   outputting the generated evaluation result on the display;
   wherein the hand spectroscope further comprises a radiation-permeable radiation window, a measurement chamber adjacent to the radiation window and defining a controlled volume, and a gas flush coupled to the measurement chamber;
   wherein the radiation-permeable radiation window has a geometric position such that the radiation-permeable radiation window is configured to provide a focusing distance between the X-ray source and the surface of the component; and
   wherein generating the evaluation result comprises comparing the measured radiation spectrum with one or more reference spectra of cleaned surfaces and/or of soiled surfaces.

2. The method of claim 1, wherein the one or more reference spectra are stored in a storage device in the hand spectroscope.

3. The method of claim 1, wherein generating the evaluation result comprises comparing the measured radiation spectrum with calibration curves which are obtained from X-ray fluorescence analysis of substance samples.

4. The method of claim 1, wherein generating the evaluation result comprises univariate analysis of peak heights, peak widths and/or peak areas of radiation intensities of the measured radiation spectrum which are associated with the characteristic substances.

5. The method of claim 1, wherein generating the evaluation result comprises multivariate analysis of the measured radiation spectrum on the basis of a chemometric method.

6. The method of claim 5, wherein the chemometric method comprises principal component analysis and/or partial least squares analysis.

7. The method of claim 1, wherein the method for detecting surface impurities is carried out on a surface of a fiber-reinforced plastics material, FRP, component.

8. The method of claim 7, wherein the FRP is a carbon-fiber-reinforced plastics material, CFRP.

9. The method of claim 7, wherein the characteristic substances comprise components of release agents for producing FRP components.

10. The method of claim 9, wherein the characteristic substances comprise silicon, hydrofluorocarbons and/or hydrocarbons.

11. The method of claim 1,
   wherein the method further comprises flushing the measurement chamber with an operating gas using the gas flush.

12. The method of claim 1, wherein the hand spectroscope further comprises a data interface, the method further comprising:
   passing the measured radiation spectrum and/or the evaluation result to an external data processing device via the data interface.

13. The method of claim 1, wherein the fluorescent radiation detector is positioned substantially closer to the radiation-permeable radiation window than the X-ray source.

* * * * *